Figure 12:
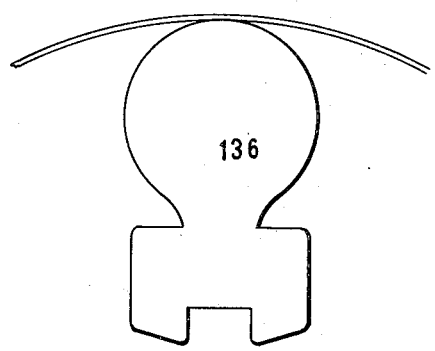
Figure 12A:
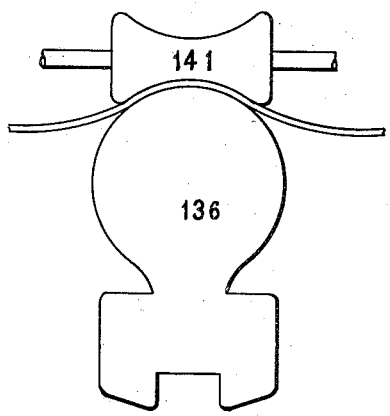
Figure 12B:
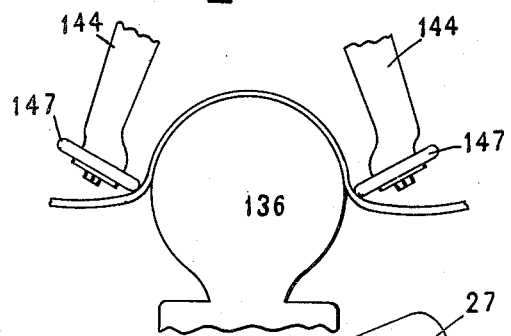
Figure 12C:
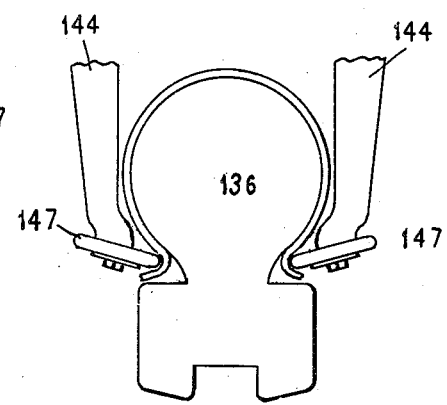

W. C. STATE.
PNEUMATIC TIRE SHOE MANUFACTURING MACHINE.
APPLICATION FILED MAR. 26, 1909.
941,962.
Patented Nov. 30, 1909.
6 SHEETS—SHEET 1.
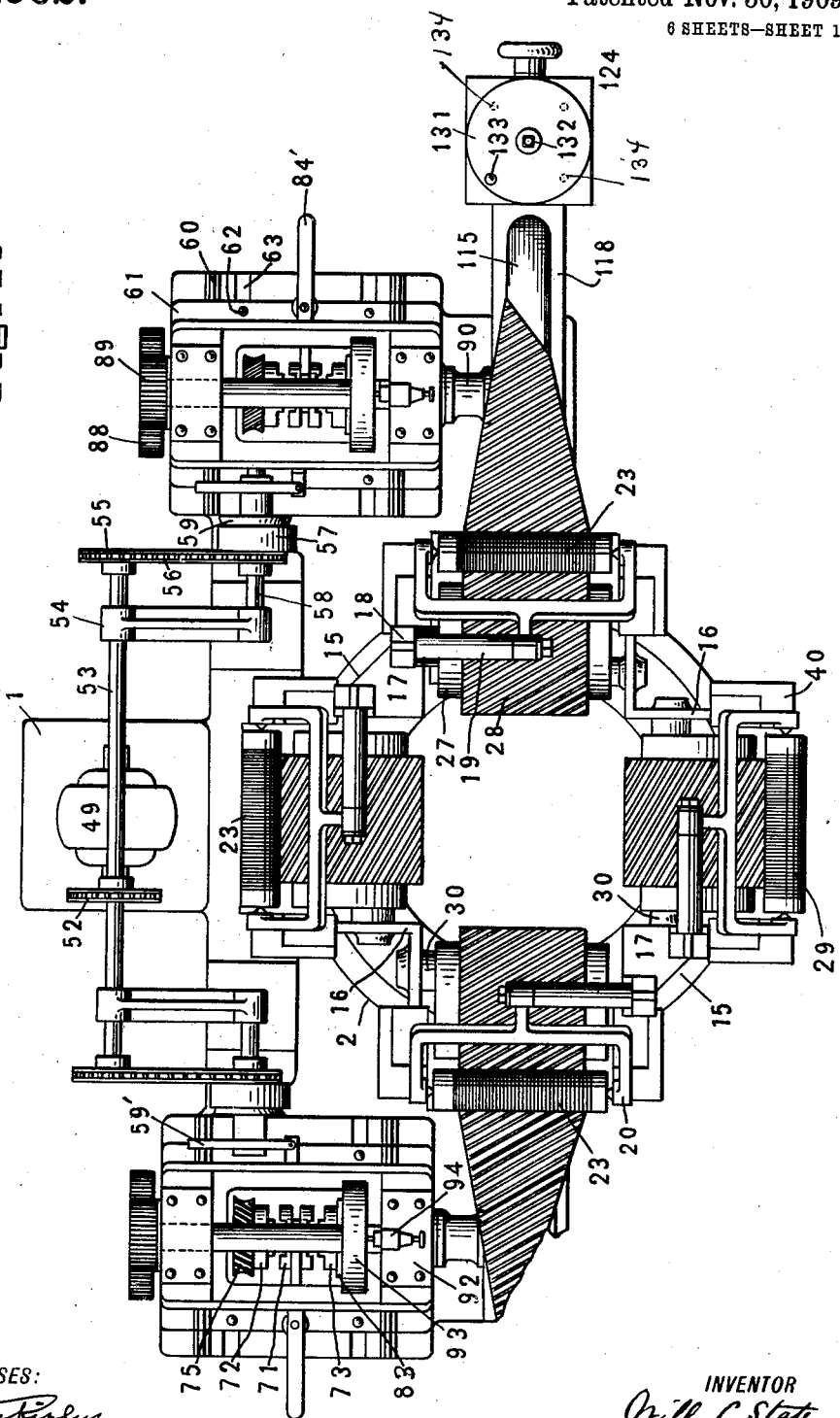
WITNESSES:
INVENTOR
Will C State
BY
ATTORNEY W. C. STATE.
PNEUMATIC-TIRE SHOE MANUFACTURING MACHINE.
APPLICATION FILED MAR. 26, 1909.
941,962.
Patented Nov. 30, 1909.
6 SHEETS—SHEET 2.
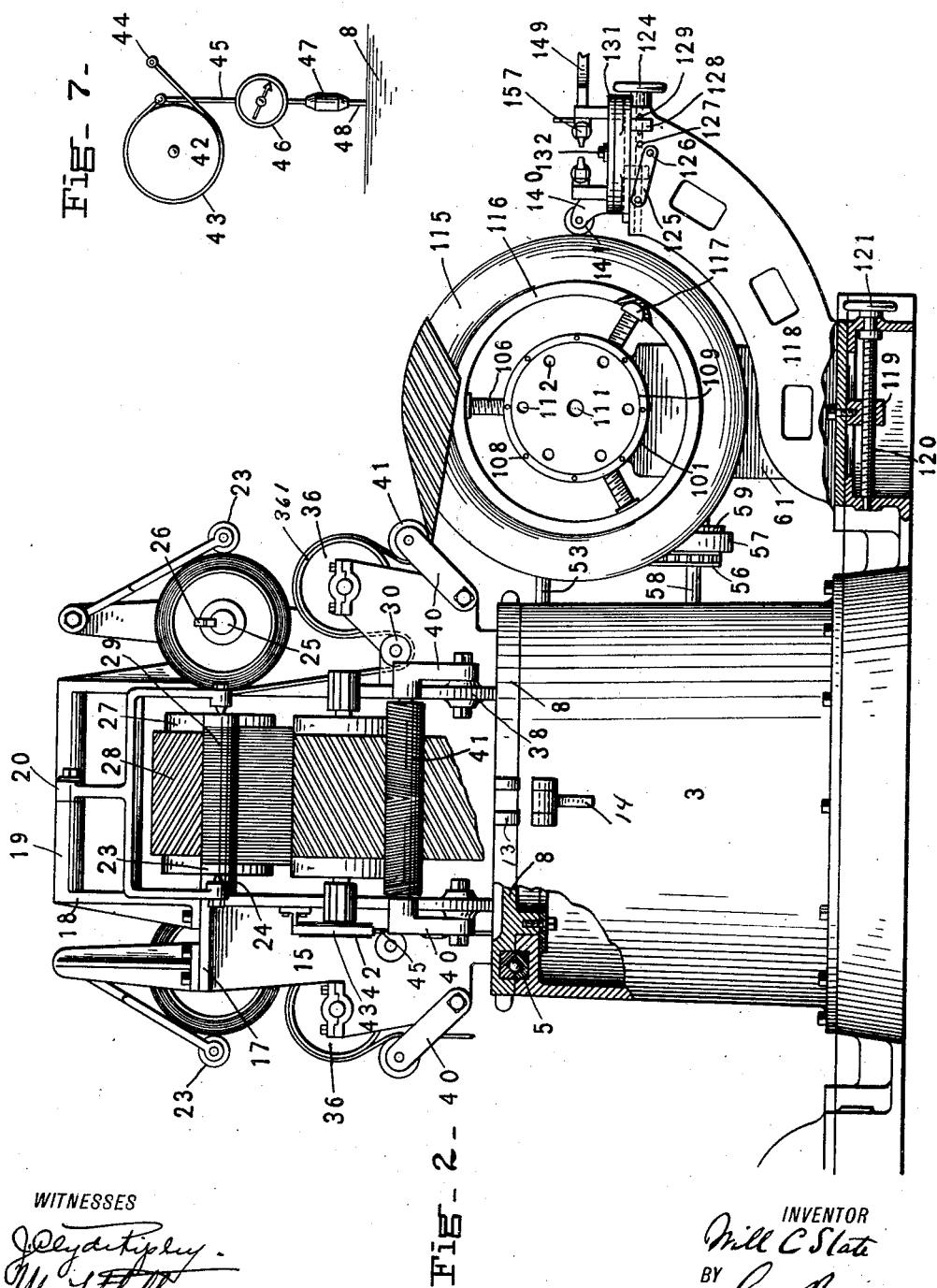
WITNESSES
INVENTOR
ATTORNEYS

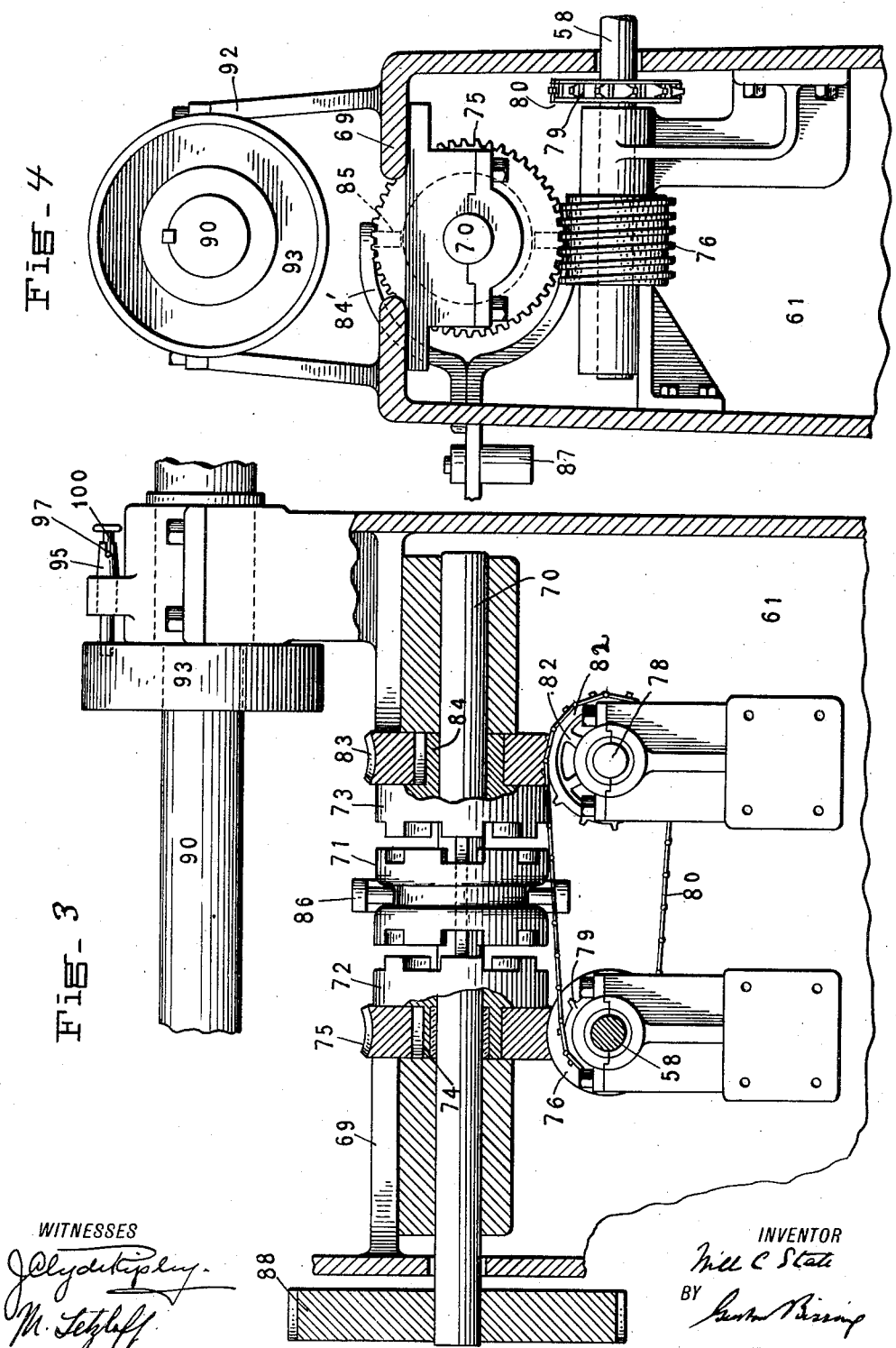

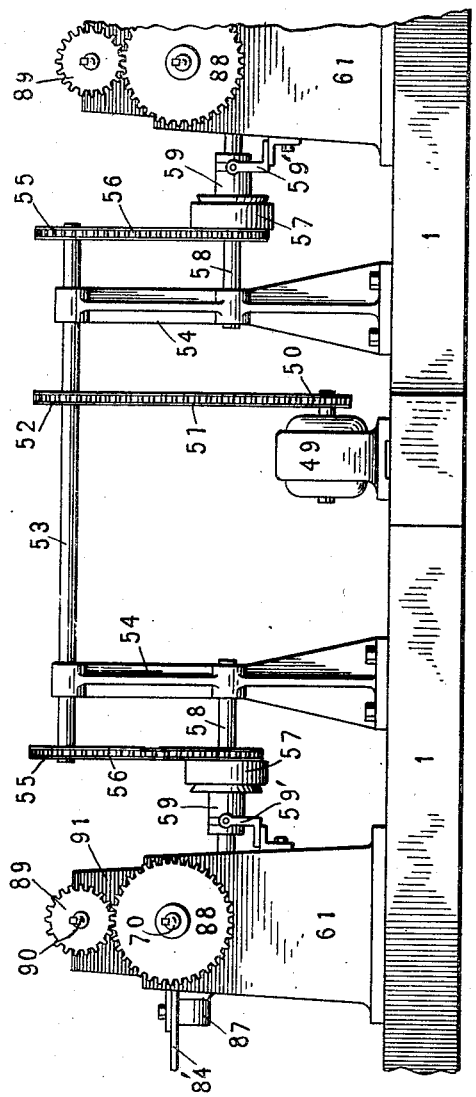
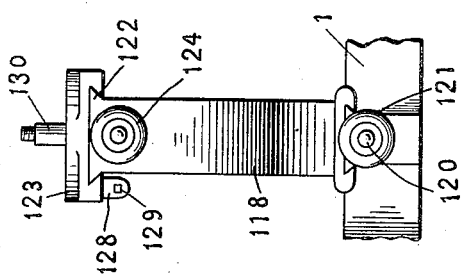

W. C. STATE.
PNEUMATIC TIRE SHOE MANUFACTURING MACHINE.
APPLICATION FILED MAR. 26, 1909.
941,962.
Patented Nov. 30, 1909.
6 SHEETS—SHEET 5.
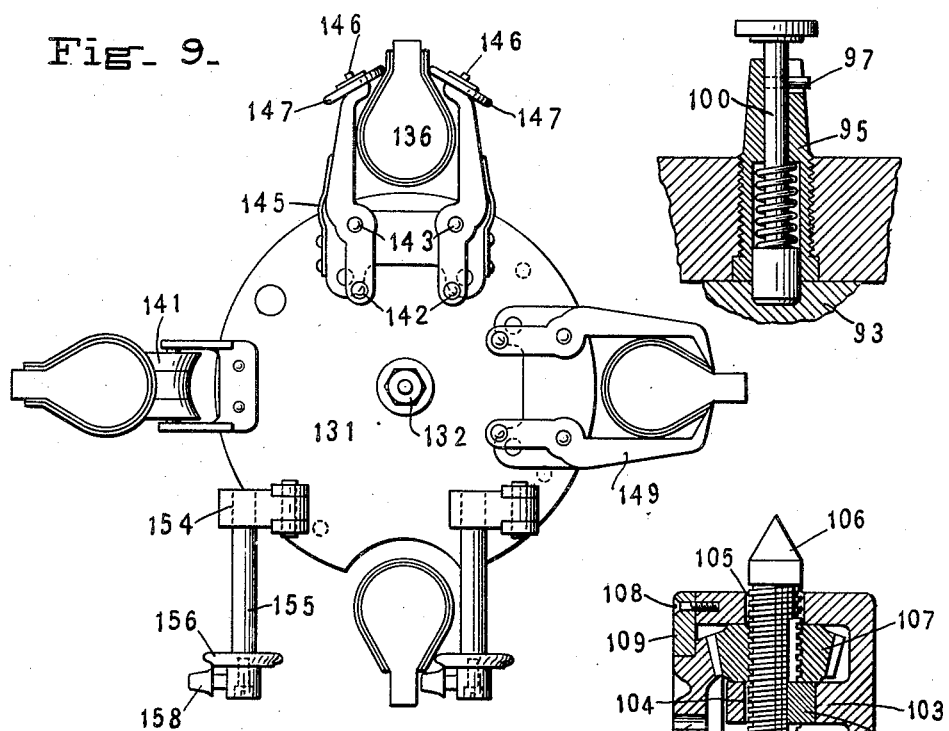
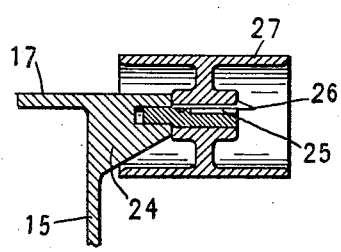
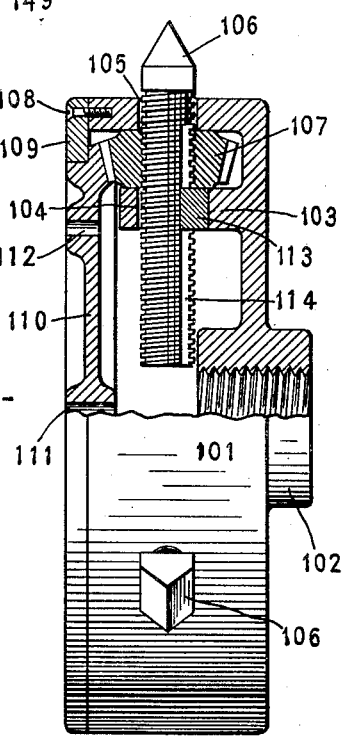
WITNESSES:
INVENTOR
Will C State
BY
ATTORNEY W. C. STATE.
PNEUMATIC TIRE SHOE MANUFACTURING MACHINE.
APPLICATION FILED MAR. 26, 1909.

941,962.

Patented Nov. 30, 1909.
6 SHEETS—SHEET 6.

WITNESSES:

INVENTOR
Will C. State
BY
ATTORNEY

UNITED STATES PATENT OFFICE.

WILL C. STATE, OF AKRON, OHIO, ASSIGNOR TO FRANK A. SEIBERLING, OF AKRON, OHIO.

PNEUMATIC-TIRE-SHOE-MANUFACTURING MACHINE.

941,962.

Specification of Letters Patent.    Patented Nov. 30, 1909.

Application filed March 26, 1909. Serial No. 486,043.

*To all whom it may concern:*

Be it known that I, WILL C. STATE, a citizen of the United States, and resident of Akron, Summit county, Ohio, have invented a new and useful Pneumatic-Tire-Shoe-Manufacturing Machine, of which the following is a specification.

My invention relates specifically to the manufacture from flat sheets of rubber-coated canvas of the open-bellied casings or more briefly the open casings or tire-shoes which are used in connection with an inflatable inner rubber tube to constitute the double-tube pneumatic tires now used on automobiles and the like. Heretofore such open-bellied or open tire-shoes in so far as they have been made direct from sheeted fabric have been made by hand. By my invention they are made by the machine which is the subject of this application. It is the first machine, known to me, which has come into commercial use for this purpose of building tire-shoes from superposed layers of sheeted fabric in contradistinction to weaving the tires from threads which are woven or laid one after the other on the ring-core or former.

My machine comprises a power-driven ring-core in connection with a pair of stock-rollers which have wound thereon strips of canvas skim-coated with rubber and cut on the bias. By this means I am enabled to supply a round of canvas on the ring-core from one roll and then a second round of canvas on the ring-core from the other roll. By properly arranging the rolls with respect to each other, the superposed layers of canvas on the ring-core will have their threads crossed, as is necessary in building strong tires. The pair of stock-rollers may be mounted one above the other, or side by side on a sliding or rotary table so that the stock can readily be drawn therefrom to the power-driven ring-core in alternation. This combination in an open tire-shoe making machine of a power-driven ring-core with a pair of stock-rolls from which alternate layers of crossed fabric may be supplied to the ring-core is an important feature of my invention.

A layer of canvas having been applied to the ring-core, a radially movable smoothing or tread-forming roll firmly shapes and presses the canvas against the ring-core near its external periphery to form the parts of the tire which lie under its tread portion. Thereupon a pair of spinning-rolls by radial motion with respect to the ring core gradually press the canvas in contact with the sides of the ring-core toward its internal periphery to shape the sides of the tire. These spinning-rolls are preferably spring-pressed and their outer periphery or working edge is disk-shaped and rounded so as not to cut the fabric. The spinning-rolls are also radially movable with reference to the ring-core. They have been found peculiarly efficient in shaping the sides of the tire-shoe and form an important feature of my invention. They are sharply differentiated from the hammers or sliding finger devices heretofore proposed for the purpose. So, too, the combination of the tread-forming roll for operating upon the tread portion and the spring-pressed spinning-rolls for shaping the sides of the tire-shoe by radial motion with reference to the ring core forms an effective instrumentality for completely shaping the tire and an important feature of my invention.

In order to prevent the several spiral layers of canvas, which are skim-coated or saturated with rubber, from sticking together while on the stock-roller, I place a strip of plain muslin or the like against the rubber-coated canvas and wind this combination upon the stock-roll. It becomes important, then, when the rubber coated canvas is drawn onto the ring-core from the stock-roll that provision be made for disposing of the muslin which is unwrapped at the same time. To this end I apply as another feature of my invention a take-up roll for the muslin which is driven by frictional contact against the outer surface of the stock-roll.

It is important to secure proper tension on the fabric as this is drawn from the stock-roll onto the ring-core. To this end I cause the fabric to pass over a rubber-covered roll to which some form of tension brake is applied. I have found, also, that the fabric in passing under tension from the stock-roll to the ring-core forms longitudinal creases. These I remove by a stretching-roll supplied with a pair of divergent spirals on its surface.

Without unduly extending this preliminary outline of my invention, I may say that an important feature of my machine results from the fact that I apply the canvas to the power-driven ring-core while this is moving quite slowly, say at six revolutions a minute. I have discovered, however, that it is not only possible but highly desirable to let the smoothing- and spinning-rolls operate upon the ring-core while this is moving at a much higher speed, say at two hundred and seven turns a minute. By this means the machine not only does more work in a given time but it does better work.

I shall now describe, in detail, the machine which constitutes the best embodiment of my invention now known to me.

Figure 13:
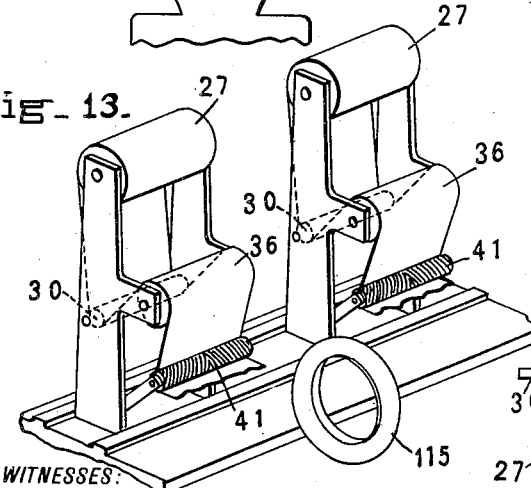
Figure 14:
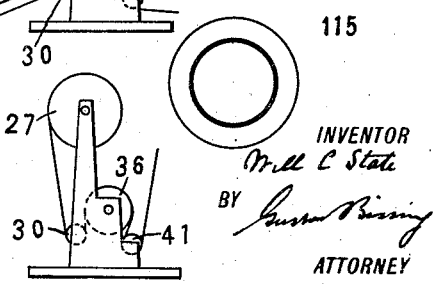

In the drawings,—Figure 1 is a plan of my device; Fig. 2 is a view in side elevation looking from the right of Fig. 1 with portions in section to illustrate the internal construction thereof; Fig. 3 is a sectional view of the mechanism for supporting and rotating the core; Fig. 4 is a sectional view of the mechanism shown in Fig. 3; Fig. 5 is a view in side elevation of the mechanism for communicating motion to the mechanism shown in Figs. 3 and 4; Fig. 6 is a view in end elevation of the support and tool carriage on which the devices used for manipulating, shaping and smoothing the fabric while being placed on the core are mounted; Fig. 7 is a view in side elevation of a tension regulating device; Fig. 8 is a view, in central section, of a lock employed in this device; Fig. 9 is a plan of a turret on which the mechanisms for manipulating the tire are mounted, also showing the various tools employed in connection with this type of device on a ring-core shaped for clencher tires; Fig. 10 is a sectional view of a standard and reel on which a supply of rubber-coated fabric is mounted; Fig. 11 is a view partly in elevation and partly in section of a chuck on which the core is mounted while the tire is being formed thereon; Figs. 12, 12$^a$, 12$^b$, 12$^c$ are cross-sections of a ring-core for inextensible-edge tires with the fabric in different stages of application; Fig. 13 is a diagram of a ring-core used alternately in connection with a pair of stock-rolls on a sliding support; and Fig. 14 is a diagram of a pair of superposed stock-rolls used alternately in connection with a ring-core.

Referring to the drawings in detail, 1 is the base carrying a cylindrically-formed member 3 upon which loosely turns the rotary head 8 by means of a ball-bearing connection 5. The base 8 is provided with a series of pairs of lugs 13, the space between each pair forming a recess to receive a locking member 14 mounted on the side of the cylinder 3 for arresting at predetermined intervals the movement of the head. Extending upwardly from the head 8, as seen in Fig. 1, are two varieties of standards 15, 16. The four standards are L-shaped in cross-section and are positioned with the angles or corners thereof inwardly toward the axis of the cylinder 3. Mounted on these standards 15 and 16 are four complete sets of rolls, and as these sets of rolls are similar, a description of one will be sufficient. Each set of rolls comprises a stock-roll, which constitutes my sheet fabric supply a take-up roll, an idle roll, a rubber-covered tension-roll and a stretching-roll which will now be described. Extending laterally from the standard 15 is an integral arm 24, shown best in Fig. 10, from the outer end of which projects a stub shaft 25 provided with a spring catch 26 for holding a stock-roller 27 on which the supply of rubber-saturated fabric 28 is wound, the successive layers of which are prevented from sticking together by interposing between them a strip of muslin or cloth 29. By releasing the catch 26, the roller 27 may be removed from its shaft 25 and replaced by another roller on which a fresh supply of fabric and cloth is wound whenever the supply on the original roller becomes exhausted.

Mounted on the shelf 17 (Figs. 1 and 2), which extends horizontally across the upper corner or angle of the standards 15, is an upright hanger 18 having a laterally extending arm 19 to the free end of which is pivotally mounted a depending yoke 20 and having mounted on pins in its free ends thereof a roller 23, hereinafter designated as the take-up roller. Below the arm 24 is an idle roller 30 (see Fig. 2) mounted between the standards 15 and 16.

In the front or outer portion of the standards 15, 16 are bearings to receive a shaft on which is mounted a tension roller 36, preferably having its outer face covered with a layer of vulcanized rubber 361, which rubber-coating I have found peculiarly efficient. The tension-roll constitutes a highly important element since it secures the application of the several layers of fabric to the ring-core with a uniform degree of tension. To this end there is mounted on one end of the shaft which bears the tension-roller 36 (Figs. 2 and 7) a disk 42 around which is a friction band 43 having one end anchored to a post 44 on one of the standards and having its other end connected to a rod 45 bearing a tension measuring gage 46 and a turnbuckle 47 at its lower end. The turnbuckle 47 is connected with some fixed support such as the base 8 by means of a second rod 48. If increased tension is desired on the tension-roller 36 the turnbuckle 47 is manipulated so as to cause a contraction of the friction band 43 on the disk 42 to a determined degree, indicated by the gage 46 so that a predetermined amount of resistance will be offered to the turning or movement of the tension-roller 36.

I have found that as the ring-core draws the fabric under tension from the stock-rolls, the fabric forms troublesome longitudinal creases which must be gotten rid of. The expedient which I have finally hit upon for this purpose consists of a stretching-roll 41, here shown as mounted in a swinging frame 40. The outer surface of the stretching-roller 41 is provided with two spirally arranged sets of grooves both commencing at the longitudinal central line thereof and diverging spirally therefrom to cause it to laterally stretch and smooth the rubber-saturated fabric which is drawn partly around it in its passage from the tension-roller, the effect of the roller being to remove all longitudinal creases and other wrinkles which will be formed in the fabric during the removal of the stock from the stock-roller on its passage to the ring-core. The arms 40 are permitted to swing on bolts and are held in any determined position by tightening nuts. By passing the fabric over the tension-roll and under the stretching-roll, the fabric is in contact with the surfaces of these rolls for a considerable fraction of the circumference.

It will be understood that the stock-roll the idle roll, the tension-roll and the stretching-roll constitute a single set of rolls, there being, in the case shown, four sets or two pairs of sets of rolls in all, one pair of set of rolls coöperating with one ring-core and the other pair of set of rolls coöperating with the other ring-core. Considering the pair of stock-rolls which coöperate with a single ring-core, it is understood that the rubber-coated canvas is applied to the two stock-rolls at alternate angles which means that when the stock rolls coöperate with the ring-core the threads of the fabric from one roll will be at an angle with the direction of the threads of the fabric from the other roll. This is brought about, in the construction which has just been described, by mounting a pair of set of stock-rolls upon the rotary head 8. But the same result could be obtained among numerous other ways by mounting a pair of stock-rolls upon a sliding head, as shown in Fig. 13, or by mounting the stock-rolls one above the other, as shown in Fig. 14 and placing the stock upon the pairs of stock-rolls so that their threads will come at angles to each other when supplied to the ring-core.

The operation of a set of rolls is as follows: In order that the ring-core may take hold of the fabric, the core is coated with rubber or cement. The rubber-coated canvas is now unwound from the stock-roll and carried downwardly under the idle roll 30, and from thence upwardly around the tension-roll 36, and from thence downwardly under and around the stretching-roll 41, and finally onto the power-driven ring-core to which the end of the canvas is made to adhere. Since the ring-core is power-driven at a low speed, the rubber-coated canvas will be drawn outwardly from under the surface of the stretching-roll as well as over the surface of the tension-roll. In this manner the fabric will be smoothed by the stretching-roll and the proper tension will be applied to it by the tension-roll. When one round of canvas has been applied to the ring-core, the length is cut off by the workman's scissors from the portion remaining on the stock-roll. The cloth which is interposed between the layers of the rubber-coated canvas on the stock-roll passes downwardly around the under face of the stock-roll and frome thence upwardly and is then rewound on the take-up roll 23 which, being hung between the arms of the pivoted yoke 20, frictionally rests on the surface of the stock-roll 27, thus receiving motion thereby. During the operation of withdrawing the strip of rubber-coated canvas from the stock-roll, the lug 14 (Fig. 2) will be inserted in the recess between the lugs 13 to prevent the revolution of the head 8.

I have now to describe the source of power for the ring-core. Mounted on the base 1 is a motor 49 having a sprocket wheel 50 driving a sprocket chain 51, passing around a sprocket wheel 52, on a shaft 53, supported by brackets 54. The shaft 53 bears, at its ends, sprocket wheels 55 driving sprocket chains 56, passing around the loose members of clutches 57, which with their coöperating tight members 59 are mounted on shafts 58 (Figs. 3, 4, 5) and are operated by clutch levers 59. Mounted on suitable ways 60 at each end of the base 1 are housings 61. Each of these housings may be provided on its under surface with suitable grooves so as to render them movable on the ways 60 and is held in a determined position by means of bolts 62, the lower ends of which engage in slots 63 formed in the base 1. The housing 61 is hollow and is provided with an opening through which the shaft 58 enters (Fig. 4). Within the housing are a pair of alined brackets provided with bearings bolted to the walls of the housing and supporting one end of the shaft 58. Extending longitudinally of the housing 61 and supported in bearings suitably secured to inturned flanges 69 formed integral with the body of the housing is a shaft 70 near the longitudinal center of which is splined a clutch member 71 having its two lateral faces formed to engage corresponding clutch members 72 and 73 mounted loosely on said shaft 70. The clutch member 72 is provided with a hub 74 rigidly secured to a spiral gear 75 adapted to be driven by means of a worm 76 mounted on the shaft 58 just as the corresponding clutch member 73 has a hub 84 secured to a spiral pinion 83 driven by a worm 82 on a shaft 78. The shaft 78 is driven from the shaft 58 by a chain and sprocket connection and the arrangement is such that the spiral gear 83 rotates much more rapidly than the spiral gear 75. It will thus be seen that the shafts 58 and 78 are constantly power driven and rotating. With them rotate the clutch-members 72 and 73, which are loose on the shaft 70. By throwing the clutch member 71, which is splined on the shaft 70, into connection with either the clutch member 73 or 72, the shaft 70 is made to revolve slowly or rapidly. The movement of the clutch member 71 is effected by the shifting lever 86.

Mounted on the shaft 70 outside of the housing 61 is a gear 88 (Fig. 5) adapted to mesh with a pinion 89 secured to the extended end of a shaft 90, mounted in the upper part of the housing 61 and carrying a locking-disk 93. Coöperating therewith is a spring pressed locking pin 100 held out of engagement with the locking-disk by a cross pin 97 moving in a slot in the casing 95 (Fig. 3). To lock the shaft 90 in a fixed position, the pin 100 is allowed to assume the position shown in Fig. 3. To permit the shaft 90 to rotate, the pin 100 is withdrawn from contact with the locking-disk 93 and held in this withdrawn position by the cross pin 97 which bears against the end of the casing 95, all in a manner readily understood.

I have now to describe the chuck for carrying the ring-core. Mounted on the shaft 90 is a chuck (see Fig. 11) comprising a cup-shaped body portion 101 provided with an internally threaded hub 102 to receive the end of the shaft 90. The interior of the member 101 is further provided with a flange 103 provided with openings 104 in radial alinement with similar openings 105 in the outer face of the chuck. Positioned in these openings 104 and 105 are exteriorly threaded shafts 106 bearing between the flange 103 and the outer wall of the chuck, nuts 107 the exterior faces of which are formed with beveled gear teeth. Secured to the outer wall of the chuck by means of screws 108 is an annular flange or ring 109 extending inwardly from the outer wall of the cup-shaped member a short distance. Mounted in the space inclosed by the ring 109 is a disk 110 provided with a central opening 111 and with a plurality of openings 112 disposed in a circle concentric with the opening 111. The outer edge of the disk 110 is provided with a shoulder to receive the ring 109 for positioning and holding the disk in place. The inner face of the disk is provided with gear teeth adapted to intermesh with the teeth on the nuts 107. Mounted in the flange 103 are keys 113 arranged to enter key-ways 114 cut longitudinally of the shafts 106 for locking them against rotation in unison with the nuts 107. The outer ends of the shafts 106 are preferably beveled to form a sharp edge for a purpose to be hereinafter described. This chuck is adapted to temporarily hold the ring-core on which the tire casing is to be built. The ring-core (Fig. 2) is provided with an inwardly-extending flange 116 having at intervals V-shaped slots 117 to receive the outer ends of shafts 106.

While I have described the mechanism for driving and supporting the ring-core in detail, so that its exact construction may be understood, it will be seen that in its essence I employ a slow-speed mechanism, in this case represented by the clutch member 73, and a fast-speed mechanism, here represented by the clutch member 72, and a speed-changing mechanism, here represented by the clutch member 71 and its shifting lever 86. But when I use the terms fast-speed mechanism, slow-speed mechanism and speed-changing mechanism in the claims, it is understood I mean any class of mechanism accomplishing these functions and not merely the specific mechanism herein shown. Power is thus transmitted from the shafts 50, 53, 58 (Fig. 5) to the shaft 70 (Fig. 4), and in turn to the shaft 90 which, by means of a suitable chuck, carries the ring-core. To mount the ring-core on the chuck, the shifting lever 86 is placed in its intermediate position with the clutch member 71 out of contact with either the fast- or slow-speed mechanism. The locking-stem 100 is now permitted to come into engagement with the locking-disk 93 to hold the shaft 90, which carries the chuck, in an immovable position. This permits the ring-core to be readily placed on the chuck. Thereupon the locking-stem 100 is withdrawn from engagement with the locking-disk 93 and the speed-shifting lever 86 is operated to throw the slow-speed mechanism into action. The ring-core is now rotated at a slow speed. At this time a single layer of rubber-coated fabric is drawn onto the ring-core from the stock-roll. The shifting-lever is now quickly actuated to stop rotation of the core. Thereupon a pair of scissors in the hand of the operator separates the strip of rubber-coated canvas, which is around the core, from the canvas wound on the stock-roll. The speed-changing mechanism is now again actuated to bring the fast-speed mechanism into action. Thereupon the tread-forming and spinning-rolls are brought into play. The supports for these I now proceed to describe.

Slidably mounted on the base 1, substantially below the position occupied by the chuck just described, is a housing 118 comprising a hollow metallic box having outlines approximately concentric with the shaft 90 provided with a depending lug 119 in its lower portion through which extends a screw 120, manipulated by a hand-wheel 121 for shifting the housing 118 toward and away from the ring-core 115, thereby making it possible to position and adjust it with respect to the latter when different sized cores are used. The upper portion of the housing 118 is provided with an outwardly-extending dovetailed portion 122 on which is slidably mounted a carriage 123 provided with a depending lug, indicated in dotted lines in Fig. 2, similar to the lug 119, adapted to receive a screw controlled by a hand-wheel 124 for shifting it toward and away from the core.

In the side of the housing 118 immediately below the carriage 123 is a pivoted arm 125 provided with a pin 126 adapted to enter a hole 127 in the side of the housing 118. Depending from the side of the carriage 123 is a lug 128 provided with a pin 129 threaded to permit its adjustment in the lug 128. When the arm 125 is swung upwardly so that the pin 126 is positioned in the hole 127 the pin 129 will engage the arm 125 and arrest further inward motion of the carriage thereby constituting an adjustable stop for accurately limiting the movement of the carriage with respect to the core. The carriage 123 bears an upwardly-extending centrally-placed pin 130 on which is mounted a revoluble head or turret 131 held from displacement by a nut 132. Reference is here directed to Fig. 9. The turret 131 bears a lock 133 exactly similar to the lock shown in Fig. 8, provided with a vertically-shiftable stem the lower end of which is adapted to enter suitable openings 134 in the upper face of the carriage 123 and lock the turret in determinate positions.

The revolving head or turret 131, which is shown simply as a sample of one type of transversely movable support I may employ, bears what for lack of a more suitable name I call the tread-forming-roll 141, the spinning-rolls 147, the cutters 149 and the bead-attaching roll 156, which can be alternately brought into play because of the rotary or transverse movement of the head 131 with respect to the ring-core. These instrumentalities may be juxtaposed to the ring-core, one after the other, by rotating the head. Since the supporting head 131 is radially movable with reference to the ring-core by means of the hand-wheel 124, it follows that each of the instrumentalities mounted thereon is radially movable with respect to the ring-core. In the case of the tread-forming-roll 141, this permits the operator to gradually bring the proper amount of pressure to bear on the canvas either which lies under or which actually forms the tire tread to thoroughly smooth it and shape it to the core. In case of the spinning-rolls 147, the radially movable and in this case sliding support permits the operator to pass the rolls gradually over the surface of the side of the ring-core that is radially with respect to the ring core from the edge of the tread portion to the tire-edge, so as to gradually bring the sheeted edge, so as to form the rubber tire into fabric which is to form the rubber tire into contact with the sides of the ring-core. In case of the pivoted cutters 149 as well as in the case of the bead-applying roll 156, the radial movability of the support renders it possible to position the parts to the proper place for the work intended with different sized ring-cores.

The tread-forming-roll is mounted in brackets on the radially and transversely movable head 131. Its axis, when in operation, is parallel to the axis of the ring-core and its curvilinear shape in longitudinal section is made to correspond to the shape of the outer or tread portion of the ringe-core. It will thus be clear that after the operator has drawn a layer of rubber-coated canvas onto the ring-core, he can, by pressing the tread-forming-roll 141 against the fabric, smooth and shape the fabric on the core and get it free of captured air bubbles or wrinkles over its outer face. This action will be all the more efficient by reason of revolving the ring-core at high speed.

The spinning-rolls 147 are preferably mounted on ball-bearings or similar anti-friction mechanism for they revolve at high speed and exert considerable pressure on the fabric. They are laterally movable, that is to say they are movable toward and away from the plane of the ring-core and this movability I effect, in the case shown, by pivoting them at 146 on arms 144 mounted on pivots 143 on the head 131. A pair of grips or hand holds 142 on the arms 144 enables the operator to force the rolls 147 apart both when they are first applied to the ring-core and when they are withdrawn therefrom, in the backward motion, after their work is finished. The spinning-rolls are also shown as spring-pressed toward the plane of the ring-core by springs 145, here shown, diagrammatically, as leaf springs although, in practice, strong spiral springs will be used. These springs exert the pressure against the fabric for forming it against the sides of the core which would be exerted by the arm of the workman in case of a hand-tool or a hand-pressed roll. In consequence the work of these spring-pressed spinning-rolls is far more even and more rapid than in the case of a roll pressed against the core by hand. And it is of course understood that there may be substituted for the springs and as an equivalent therefor the more cumbersome device of a weight constantly tending to force the spinning-rolls, with considerable pressure, toward the ring-core. When then I say the spinning-rolls or their supports are laterally spring-pressed, I mean either spring or weight pressed laterally against the ring-core for, as before stated, a spring is the equivalent of a weight. In a broader aspect of my invention, however, I may employ mechanical instrumentalities, not the hands of the operator, other than springs or weights for pressing the spinning-rolls laterally against the ring-core. I shall, then, use the term "power-pressed" to cover generally not only springs and weights but other mechanical instrumentalities for pressing the spinning-rolls against the ring-core. When I refer to my spinning-rolls as laterally yielding and no more, I mean to include any source of power for pressing the spinning-rolls against the ring-core, even the comparatively inefficient and irregular power contained in the hands of the operator. While I have shown these spinning-rolls as disk-shaped throughout, it will naturally be understood that the disk-like or narrow character of the rolls is only essential at the periphery which is rounded and not sharp so as not to cut the fabric. By having the outer or working edge of the spinning-roll of a narrow or disk-shape or bead form, it follows that this working edge can effectually contact with the fabric at all portions along the sides of the ring-core. This would be impossible with a roller of the type shown at 141. On the other hand, the spinning-rolls are not so well adapted as the rolls 141 to shape the tread portion of the tire. It will be noted finally that I mount the spinning-rolls with their plane not at a right angle to but to recede at an acute angle from the plane of the ring-core. The fact is when the ring-core is rotating at high-speed, the centrifugal force tends to throw the fabric out at a right angle from the core-plane and unless the roller recedes in the manner shown, the fabric will become entangled with it. Besides the spinning-rolls, when mounted in this way, are found to have a better forming action on the fabric.

The action of the pivoted cutters 149 will be understood without much description. They are brought into position by turning the head 131 and forced together at the proper time to trim the edges of the fabric which has been applied to the ring-core.

The bead-applying rolls 156, 158 are mounted on the arms 155 which swing on the arms 154. The ordinary bead, such as is used in forming a clencher tire, being put into place on one or more layers of fabric which have already been applied to the ring-core, the rolls 156, 158 are swung into place and press the bead firmly into position as the ring-core rotates.

I have shown in Fig. 9 the type of ring-core which will be used for clencher tires. But, clearly, my machine can also be used to make tire-shoes of the inextensible-edge type. To this end I use a collapsible ring-core, the shape of which in cross-section is shown in Figs. 12, 12$^a$, 12$^b$ and 12$^c$. The fabric in the several stages of application is also shown in these several figures. The ring-core has two lateral grooves which furnish lodgment for the heavy inextensible edge which is employed in this class of tires. It will be understood that one or more layers of fabric are applied to the ring-core, that the inextensible selvages are then placed into the lateral grooves by hand and that the outer layers or plies of fabric are finally applied over the inextensible selvage. In this case the pivoted cutter 149 may be replaced by a knife in the hands of the workman, since the edge of the lateral groove will act as a guide and that the bead-applying rolls 156, 158 are dispensed with. The tread-forming-rolls 141 and the spinning-rolls 147 are alone used.

Before describing the operation of the device, attention is directed to the fact that the machine is so constructed that there are two cores on which separate workmen can simultaneously work and place fabric, these being placed diametrically opposite to each other, as shown in Fig. 1, and each core is provided with its appropriate mechanism all driven from the same source of power.

The operation of my machine will now be reasonably clear. As I have before explained, a ring-core supplied with some adhesive material on its exterior portion is placed upon the chuck while the speed-shifting lever is in position to hold the speed-mechanism out of action. Thereupon, by properly rotating and locking the rotary support for the stock-rollers, a given stock-roll is brought opposite to the ring-core and the end of the fabric thereon is pasted against the ring-core. The slow-speed mechanism being now brought into action, the ring-core slowly rotates, making a single turn in about ten seconds, drawing the rubber-coated fabric from off the stock-roll and around the tension and stretching-rolls. It results that one round of fabric is now applied under uniform tension to the ring-core. Thereupon the speed gear is put out of action, the ring-core stops moving, and the operator cuts the rubber-coated fabric across to separate the round of fabric which is on the ring-core from the fabric which yet remains on the stock-roll.

The fast-speed mechanism is now brought into play. The tread-forming-roll 141 is then brought into action to shape and smooth the tread-portion of the fabric against the outer periphery of the ring-core. The proper pressure is applied to the tread-forming-roll 141 by the devices which make it radially movable, that is by the hand-wheel 124 which radially moves the carriage 121 and 131. The parts of the tire which will ultimately lie under the tread having been shaped and the fast-speed gears still being kept in action, the carriage 131 is rotated to juxtapose the spring pressed spinning-roll 147 to the ring-core. The operator forces these rolls apart against the action of the springs. At first the spinning-rolls are positioned to act upon the edges of the tread portion of the tire-shoe. But they are gradually moved radially by the operator by operating the hand-wheel 124 so that they pass over the side portions of the tire-shoe as illustrated in Figs. 12$^a$, 12$^b$ and Fig. 9. Thus the entire tire-shoe is gradually shaped to the ring-core. The operator now forces the spinning-rolls apart and operates the wheel 124 in the reverse direction to withdraw them from reach of the ring-core but without touching the fabric in this reverse motion.

A single layer of canvas having been applied to and smoothed and shaped upon the ring-core, it will be obvious that the operator will bring the slow-speed mechanism into action, that he will now take his rubber-coated fabric from a second stock-roll and will apply this upon the layer of fabric already on the ring-core in precisely the same way as the first layer of fabric was applied to the ring-core itself. But, by the provision of the two stock-rolls having the rubber-coated canvas thereon constituted of strips cut on the bias, it will be plain that it will be easy to arrange matters so as to have the threads of the canvas layer first applied at an angle to the threads of the canvas layer next applied. This is necessary to make the best type of tire. Two or more layers of canvas having been applied, the cutter may be brought into action to trim the edges of the tire. Thereupon the bead is put in place and the bead-applying rolls are brought into action. Finally, several more layers of fabric with their threads crossed are applied to the ring-core, precisely as in the case of the layers originally applied.

I may say in conclusion that whereas an operator can make seven or eight tires a day by hand, he can make from forty to sixty a day by my machine and make them better than they can be made by hand.

I claim,—

1. An open tire-shoe making machine comprising the combination of a power-driven ring-core, and a pair of stock-rolls for carrying strips of sheeted fabric having their threads at alternate angles for alternate application to the core, substantially as described.

2. An open tire-shoe making machine comprising the combination of a power-driven ring-core, a transversely movable support, and a pair of stock-rolls for carrying strips of sheeted fabric having their threads at alternate angles mounted on the support for alternate juxtaposition to the ring-core, substantially as described.

3. An open tire-shoe making machine comprising the combination of a power-driven ring-core, a rotary support, and a pair of stock-rolls for carrying strips of sheeted fabric having their threads at alternate angles, mounted on the support for alternate juxtaposition to the core, substantially as described.

4. An open tire-shoe making machine comprising the combination of a sheet-fabric supply, a power-driven ring-core, a radially moving support laterally spring-pressed toward the core, and a spinning-roll mounted on the support for passing radially along the sides of the tire-shoe to shape the sheeted fabric on the core, substantially as described.

5. An open tire-shoe making machine comprising the combination of a sheet-fabric supply, a power-driven ring-core, a radially moving support laterally spring-pressed toward the core, and a spinning-roll mounted on the support at a receding angle to the plane of the core for passing radially along the sides of the tire-shoe to shape the sheeted fabric on the core, substantially as described.

6. An open tire-shoe making machine comprising the combination of a sheet-fabric supply, a power-driven ring-core, a radially moving support laterally spring-pressed toward the core, and a spinning-roll having a rounded disk-shaped working edge mounted on the support for passing radially along the sides of the tire-shoe to shape the sheeted fabric on the core, substantially as described.

7. An open tire-shoe making machine comprising the combination of a sheet-fabric supply, a power-driven ring-core, a radially moving support laterally spring-pressed toward the core, and a spinning-roll having a rounded disk-shaped working edge mounted on the support at a receding angle to the plane of the core for passing radially along the sides of the tire-shoe to shape the sheeted fabric on the core, substantially as described.

8. An open tire-shoe making machine comprising the combination of a sheet-fabric supply, a power-driven ring-core, a radially movable thread-forming-roll for shaping the outer portion of the tire, a radially moving support laterally spring-pressed against the core, and a spinning-roll mounted on the support to pass radially along the sides of the tire-shoe to shape the sheeted fabric on the core, substantially as described.

9. An open tire-shoe making machine comprising the combination of a sheet-fabric supply, a power-driven ring-core and a transversely and radially movable support carrying both a tread-forming-roll for shaping the outer portion of the tire and a laterally yielding spinning-roll for passing radially over the sides of the tire-shoe to shape the sheeted fabric on the core, which rolls are alternately juxtaposed to the ring-core, substantially as described.

10. An open tire-shoe making machine comprising the combination of a sheet-fabric supply, a power-driven ring-core, and a radially movable, rotary support carrying a tread-forming-roll for shaping the outer portion of the tire-shoe and a laterally yielding spinning-roll for passing radially along the sides of the tire-shoe to shape the sheeted fabric on the core, substantially as described.

11. An open tire-shoe making machine comprising the combination of a stock-roll for carrying a strip of sheet-fabric, a ring-core, a slow-speed mechanism for actuating the core when receiving fabric from the stock-roll, a forming-roll, a fast-speed mechanism for actuating the ring-core during the operation of the forming-roll, and speed-changing mechanism, substantially as described.

12. An open tire-shoe making machine comprising the combination of a stock-roll for carrying a strip of sheet-fabric, a ring-core, a slow-speed mechanism for actuating the core when receiving fabric from the stock-roll, a radially moving spinning-roll for passing radially over the side of the tire-shoe to shape the fabric on the core, fast-speed mechanism for actuating the ring-core during the operation of the spinning-roll, and speed-changing mechanism, substantially as described.

13. An open tire-shoe making machine comprising the combination of a stock-roll for carrying a strip of sheet-fabric, a ring-core, a slow-speed mechanism for actuating the core when receiving fabric from the stock-roll, a radially moving support laterally power-pressed against the ring-core, a spinning-roll mounted on the support at a receding angle to the ring-core to pass over the side of the tire-shoe to shape the fabric on the core, a fast-speed mechanism for actuating the ring-core during the operation of the spinning-roll, and speed-changing mechanism, substantially as described.

14. An open tire-shoe making machine comprising the combination of a stock-roll for carrying a strip of sheeted fabric, a ring-core, a slow-speed mechanism for actuating the core when receiving fabric from the stock-roll, a radially and transversely movable support, a tread-forming-roll and a laterally yielding spinning-roll for passing radially over the sides of the tire-shoe mounted thereon, fast-speed mechanism for actuating the ring-core during the operation of the tread-forming and spinning-rolls, and speed-changing mechanism, substantially as described.

15. An open tire-shoe making machine comprising the combination of a power-driven ring-core, a stock-roll for carrying a spiral winding of rubber-coated fabric and muslin, or the like, and a yieldingly mounted take-up roll frictionally engaging the material on the stock-roll, whereby the muslin is taken up as the rubber-coated fabric is drawn onto the ring-core, substantially as described.

16. An open tire-shoe making machine comprising the combination of a stock-roll for carrying a strip of sheeted fabric, a tension-roll, a power-driven ring-core for drawing the sheeted fabric under tension from the stock-roll, and a stretching-roll provided with divergent, spirally arranged sets of grooves between the tension roll and the ring-core, whereby the longitudinal creases are taken out of the fabric in its passage to the ring-core, substantially as described.

17. An open tire-shoe making machine comprising the combination of a stock-roll for carrying a strip of sheeted fabric, a tension device, a power-driven ring-core for drawing the fabric under tension from the stock-roll, and a stretching-roll between the tension device and ring-core, whereby the longitudinal creases are taken out of the fabric and it is smoothly and evenly applied to the ring-core, substantially as described.

18. An open tire-shoe making machine comprising the combination of a power-driven ring-core, a movable head, and two sets of rolls for alternate juxtaposition to the core, each set comprising the stock-roll for carrying a strip of sheeted fabric having its threads at alternate angles, and a tension-roll over which the fabric passes on its way to the core, substantially as described.

19. An open tire-shoe making machine comprising the combination of a power-driven ring-core, a movable head, and two sets of rolls for alternate juxtaposition to the core, each set comprising a stock-roll for carrying a strip of sheeted fabric having its threads at alternate angles, and a stretching-roll provided with divergent, spirally arranged sets of grooves over which the fabric passes on its way to the core, substantially as described.

20. An open tire-shoe making machine comprising the combination of a power-driven ring-core, a movable head and two sets of rolls for alternate juxtaposition to the core, each set comprising a stock-roll for carrying a strip of sheeted fabric having its threads at alternate angles, a tension-roll and a stretching-roll over which the fabric passes on its way to the core, substantially as described.

21. An open tire-shoe making machine comprising the combination of two power-driven ring-cores, a rotary head, a pair of stock-rolls mounted thereon for alternate juxtaposition to one core carrying sheeted fabric with their threads at alternate angles, and another pair of stock-rolls mounted on the head for alternate juxtaposition to the other core also carrying sheeted fabric with their threads at alternate angles, substantially as described.

22. An open tire-shoe making machine comprising the combination of a sheet-fabric supply, a power-driven ring-core, a radially moving support laterally power-pressed toward the core, and a spinning-roll mounted on the support for passing radially along the sides of the tire-shoe to shape the sheeted fabric on the core, substantially as described.

23. An open tire-shoe making machine comprising the combination of a sheet-fabric supply, a power-driven ring-core, a radially moving support laterally power-pressed toward the core, and a spinning-roll mounted on the support at a receding angle to the plane of the core for passing radially along the sides of the tire-shoe to shape the sheeted fabric on the core, substantially as described.

24. An open tire-shoe making machine comprising the combination of a sheet-fabric supply, a power-driven ring-core, a radially moving support laterally power-pressed toward the core, and a spinning-roll having a rounded, disk-shaped working edge mounted on the support for passing radially along the sides of the tire-shoe to shape the sheeted fabric, on the core, substantially as described.

25. An open tire-shoe making machine comprising the combination of a sheet-fabric supply, a power-driven ring-core, a radially moving support laterally power-pressed toward the core, and a spinning-roll having a rounded disk-shaped working edge mounted on the support at a receding angle to the plane of the core for passing radially along the sides of the tire-shoe to shape the sheeted fabric on the core, substantially as described.

26. An open tire-shoe making machine comprising the combination of a sheet-fabric supply, a power-driven ring-core for drawing the sheet-fabric from the source of supply in a flat condition, a radially sliding support, and a laterally yielding spinning-roll on the support for passing radially along the sides of the ring-core to curve and shape the sheeted fabric thereon, substantially as described.

In testimony whereof I have signed my name to this specification in the presence of two subscribing witnesses.

WILL C. STATE.

Witnesses:
R. M. LEMIEUX,
O. W. MYERS.

DISCLAIMER.

941,962.—*Will C. State*, Akron, Ohio. PNEUMATIC-TIRE-SHOE-MANUFACTURING MACHINE. Patent dated November 30, 1909. Disclaimer filed February 14, 1919, by the assignee, *Frank A. Seiberling*.

Enters his disclaimer as follows:

"First. In respect to each of claims 4, 5, 6, and 7 of said patent, I hereby disclaim any combination of the recited elements *except when* constructed and coördinated for shaping and applying a previously unshaped sheet-fabric strip to that part of the recited ring-core beyond the tread portion, *and unless* the ring-core is rotatable at fast speed by the power-drive, whereby the unapplied fabric portion is thrown out from the side of the ring-core by centrifugal force, and the recited spinning-roll support is mechanically mounted to insure its radial movement with a gradual advance in proper relation to the fast rotating ring-core, whereby the spinning-roll, by such gradual advance over the ring-core and while pressed toward it, acts gradually upon the centrifugally thrown-out fabric to shape it to the side of the rotating ring-core while bringing it into adhesive contact therewith.

"Second. In respect to each of claims 12 and 13 of said patent, I hereby disclaim any combination of the recited elements, *except for* the combined operations of first stretching the middle or tread portion of a previously unshaped fabric strip onto the recited ring-core and thereafter shaping and applying to the ring-core the fabric beyond the tread portion, *and unless* the recited elements are so constructed and coördinated that before the change from slow speed to fast speed the fabric strip as drawn from the recited stock roll onto the ring-core is stretched circumferentially under uniform tension while applying it to the tread portion, and, after the change to fast speed, the unapplied fabric beyond the tread portion is thrown out from the side of the ring-core by the consequent centrifugal force, while the recited spinning-roll, in its radial movement, acts gradually upon the centrifugally thrown-out fabric, to shape it to the side of the rotating ring-core beyond the tread portion while bringing it into adhesive contact therewith.

"Third. In respect to each of claims 22, 23, 24, 25, and 26, of said patent, I hereby disclaim any combination of the recited elements *except when* constructed and coördinated for shaping and applying a previously unshaped sheet fabric strip to that part of the recited ring-core beyond the tread portion, *and unless* the power-drive for the ring-core functions by a sufficiently high speed of rotation and consequent centrifugal force to throw the unapplied fabric portion out from the side of the ring-core, while the recited spinning-roll, in its radial movement and while pressed toward the ring-core, functions by a gradual action upon such centrifugally thrown-out fabric, to shape it to the side of the rotating ring-core while bringing it into adhesive contact therewith.

"Fourth. I hereby further disclaim that part of the claim of invention in said patent contained in claims 8, 9, 10, 11, 14, 15, 16, and 17, respectively.

"Fifth. In respect to the specification of said patent, I hereby disclaim at page 1, lines 79–80, the words 'and an important feature of my invention,' and at page 1, lines 92–93, the words 'as another feature of my invention.'"